(12) United States Patent
Worrell (10) Patent No.: US 7,681,017 B2
(45) Date of Patent: Mar. 16, 2010

(54) PSEUDO PIPELINE AND PSEUDO PIPELINED SDRAM CONTROLLER

(75) Inventor: Frank Worrell, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 57 days.

(21) Appl. No.: 11/487,929

(22) Filed: Jul. 17, 2006

(65) Prior Publication Data

US 2007/0101089 A1 May 3, 2007

Related U.S. Application Data

(60) Provisional application No. 60/732,684, filed on Nov. 1, 2005.

(51) Int. Cl.
*G06F 7/38* (2006.01)
*G06F 9/00* (2006.01)
*G06F 9/44* (2006.01)

(52) U.S. Cl. ........................ 712/220; 711/169

(58) Field of Classification Search ............ 710/51; 711/169; 703/21; 712/220, 218
See application file for complete search history.

(56) References Cited

U.S. PATENT DOCUMENTS

| 4,293,950 | A | * | 10/1981 | Shimizu et al. ............. 714/743 |
| 5,111,431 | A | * | 5/1992 | Garde .................... 365/189.02 |
| 5,428,754 | A | * | 6/1995 | Baldwin ..................... 712/220 |
| 5,471,487 | A | * | 11/1995 | Andrighetti ................. 714/811 |
| 6,000,016 | A | * | 12/1999 | Curtis et al. ................ 711/138 |
| 6,266,750 | B1 | * | 7/2001 | DeMone et al. ............. 711/169 |
| 2003/0200237 | A1 | * | 10/2003 | Naoi .......................... 708/233 |
| 2004/0059874 | A1 | * | 3/2004 | Murray et al. .............. 711/138 |

* cited by examiner

*Primary Examiner*—Eddie P Chan
*Assistant Examiner*—George D Giroux
(74) *Attorney, Agent, or Firm*—Christopher P. Maiorana, PC (57) ABSTRACT

A pseudo pipeline including a plurality of pseudo pipeline stages and a control circuit. The control circuit may be configured to control the plurality of pseudo pipeline stages to provide pseudo pipelined operation.

26 Claims, 7 Drawing Sheets

PSEUDO PIPELINE AND PSEUDO PIPELINED SDRAM CONTROLLER

This application claims the benefit of U.S. Provisional Application No. 60/732,684, filed Nov. 1, 2005 and is hereby incorporated by reference in its entirety.

FIELD OF THE INVENTION

The present invention relates to memory controllers generally and, more particularly, to a pseudo pipeline and pseudo pipelined synchronous dynamic random access memory (SDRAM) controller.

BACKGROUND OF THE INVENTION

Data and control pipelines are common in digital electronics. Earlier SDRAM controllers using a pipelined approach failed. Variable delays between different stages of SDRAM transactions proved to be extremely difficult to accommodate. The addition of page mode transactions was even worse. Page mode transactions skipped some stages entirely. Static random access memory (SRAM) transactions failed completely. The SRAM transactions used all the stages in parallel, instead of sequentially like the SDRAM transactions.

It would be desirable to have a SDRAM controller that accommodates SDRAM and SRAM transactions.

SUMMARY OF THE INVENTION

The present invention concerns a memory controller including a plurality of pseudo pipeline stages and a control circuit. The control circuit may be configured to control the plurality of pseudo pipeline stages to provide pseudo pipelined operation.

The objects, features and advantages of the present invention include providing a pseudo pipeline that may (i) be used to implement a pseudo pipelined synchronous dynamic random access memory (SDRAM) controller, (ii) be used to manage a program counter (PC) of a central processing unit (CPU), (iii) transcend limitations of conventional pipelines, (iv) allow operations to flow through a pseudo pipeline with few restrictions, (v) allow operations to flow with variable delay, (vi) allow operations to skip stages of the pseudo pipeline, (vii) allow operations to use multiple stages of the pseudo pipeline simultaneously and/or (viii) allow operations to flow backwards.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
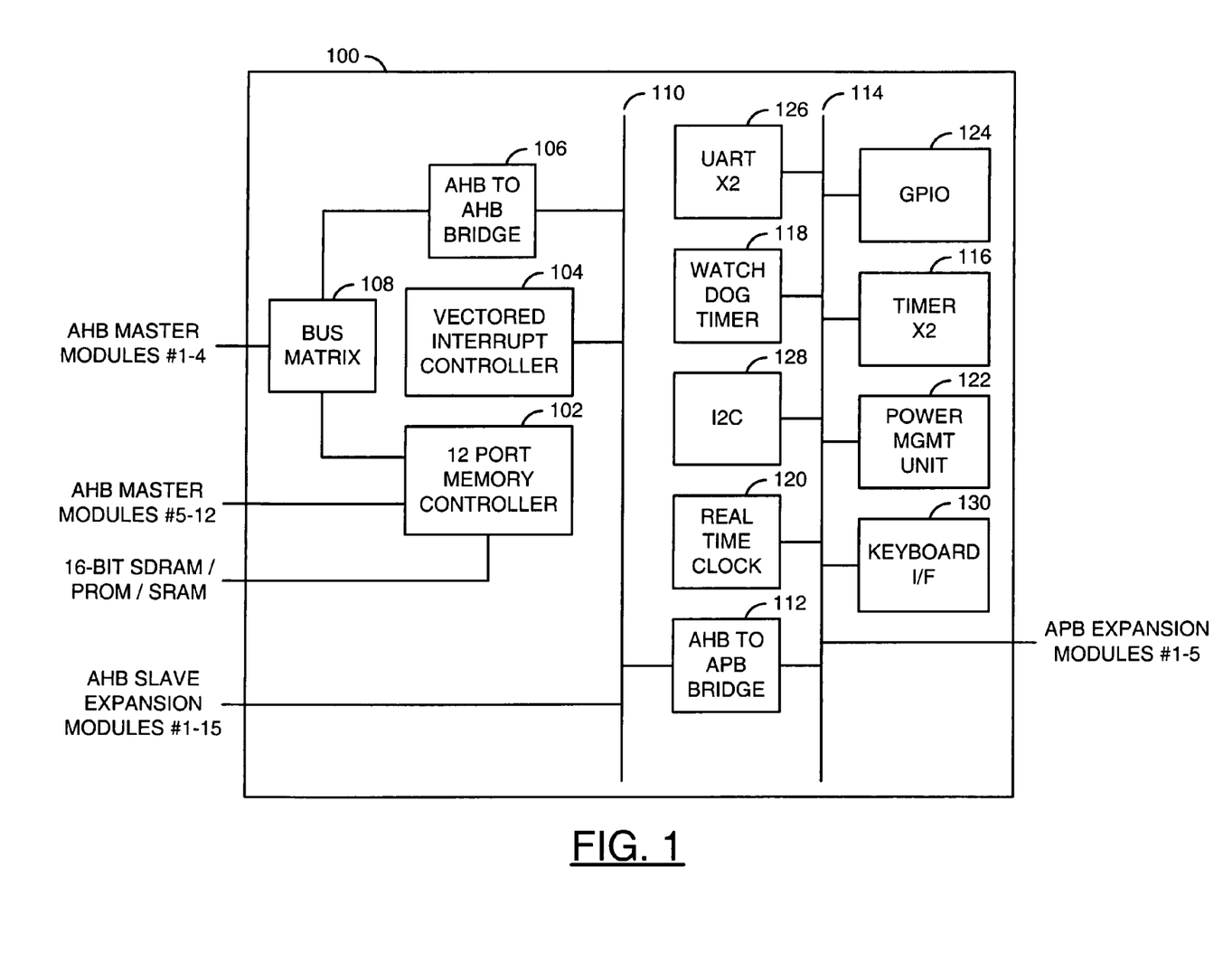
FIG. 1 is a block diagram illustrating an application processor architecture including a memory controller in accordance with the present invention.

Referring to FIG. 1, a block diagram is shown illustrating an application processor architecture 100. The architecture 100 may be used by system designers to cost-effectively design System-on-Chips (SoC). The architecture 100 may comprise a memory controller 102, an interrupt controller 104, an AHB-to-AHB bridge 106, a bus matrix block 108, an AHB bus 110, an AHB-to-APB bridge 112, APB bus 114, a timer block 116, a watchdog timer (WDT) 118, a real time clock (RTC) 120, a power management unit (PMU) 122, a general purpose input/output (GPIO) block 124, a UART 126, an I2C block 128 and a keyboard interface 130. The memory controller 102 may be implemented, in one example, as a multi-ported synchronous dynamic random access memory (SDRAM) controller. In one example, the memory controller 102 may be implemented with 12 ports. The interrupt controller 104 may be implemented, in one example, as a 32-channel interrupt controller. The timer block 116 may be implemented, in one example, as a number of 16-bit timers.

In one example, the memory controller 102 may be implemented as a pseudo pipelined SDRAM controller. The memory controller 102 may comprise, in one example, a pseudo pipeline implemented in accordance with preferred embodiments of the present invention. In one example, a first number of AHB master modules may be coupled directly to the memory controller 102 and a second number of AHB master modules may be coupled to the memory controller 102 through the bus matrix 108. The memory controller 102 may be coupled to any of a synchronous dynamic random access memory (SDRAM), a static random access memory (SRAM) and/or a programmable read only memory (PROM). The present invention may be applicable also to Double Data Rate (DDR and DDR2) SDRAM.

The AHB bus 110 may be coupled directly to the interrupt controller 104 and the AHB-to-AHB bridge 106. A number of AHB slave modules may be coupled to the AHB bus 110. The AHB bus 110 may be coupled to the APB bus 114 via the AHB-to-APB bridge 112. The APB bus 114 may be coupled to each of the blocks 116-130. A number of APB expansion modules may be connected to the APB bus 114.

Figure 2:
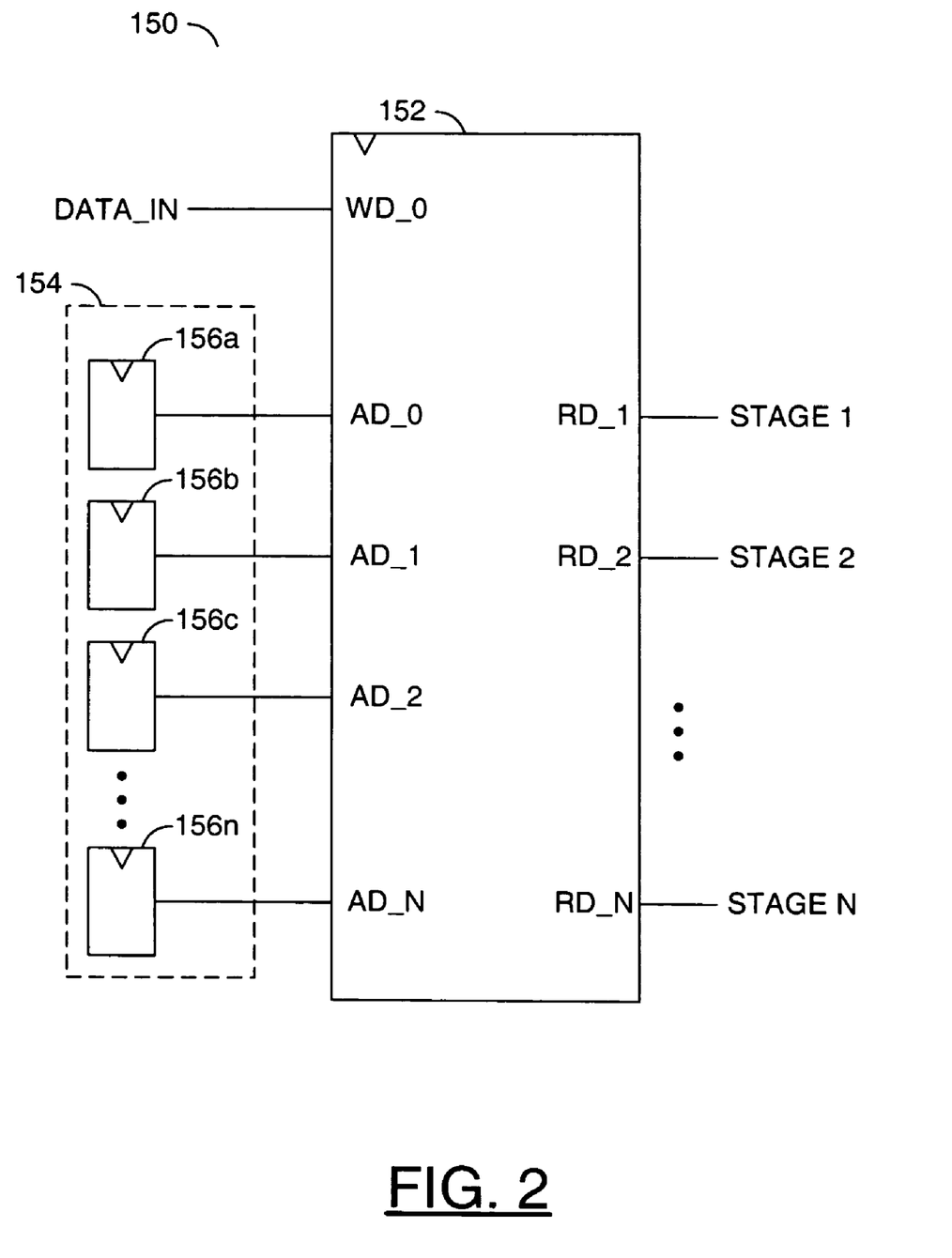
FIG. 2 is a block diagram illustrating a pseudo pipeline in accordance with preferred embodiments of the present invention.

Referring to FIG. 2, a block diagram is shown illustrating a pseudo pipeline 150 implemented in accordance with preferred embodiments of the present invention. The pseudo pipeline 150 may comprise a block (or circuit) 152 and a block (or circuit) 154. The block 152 may be implemented as a multi-port register file. The block 154 may be implemented as a control block. The register file 152 may comprise a number of pseudo pipeline stages (e.g., STAGE 1-STAGE N). In contrast to a conventional pipeline, the pseudo pipeline 150 may be implemented with no fixed relationship between pseudo pipeline stages. For example, operation of one pseudo pipeline stage with respect to a previous stage may proceed after 0 to N clock cycles. The variable delay between stages may allow the pseudo pipeline 150 to optimally accommodate SDRAM or SRAM timing. The depth (or number of registers) implemented in the register file 152 is generally determined by the number of transactions that may be active simultaneously.

The control circuit 154 may comprise a number of pointers 156a-156n. In one example, the pointer 156a may be implemented as a write pointer and the pointers 156b-156n may be implemented as read pointers. In one example, a signal (e.g., DATA_IN) may be written into a first port of the register file 152 using a first address (e.g., AD_0) provided by the write pointer 156a. Read data (e.g., signals RD_1-RD_N) for each of the stages 1-N may be accessed using addresses (e.g., AD_1 to AD_N) provided by the read pointers 156b-156n. However, more complex pseudo pipelines may be implemented with additional write ports and/or read ports.

Operation of a conventional 4-stage pipeline is generally illustrated in the following TABLE 1:

TABLE 1

| | TIME: | | | | | | | |
| --- | --- | --- | --- | --- | --- | --- | --- | --- |
| | t + 1 | t + 2 | t + 3 | t + 4 | t + 5 | t + 6 | t + 7 | t + 8 |
| Stage 1 | 1 | 2 | 3 | 4 | 5 | 5 | | |
| Stage 2 | | 1 | 2 | 3 | 4 | 4 | 5 | |
| Stage 3 | | | 1 | 2 | 3 | 3 | 4 | 5 |
| Stage 4 | | | | 1 | 2 | | 3 | 4 |

Transactions 1 and 2 flow smoothly through the pipeline stages. Transaction 3 stalls at time t+5. The stall of transaction 3 creates a pipeline bubble in stage 4 at time t+6. Transactions 4 and 5 also stall at time t+5 to avoid overrunning.

An operation of a 4-stage pseudo pipeline in accordance with the present invention is generally illustrated in the following TABLE 2:

TABLE 2

| | TIME: | | | | | | | |
| --- | --- | --- | --- | --- | --- | --- | --- | --- |
| | t + 1 | t + 2 | t + 3 | t + 4 | t + 5 | t + 6 | t + 7 | t +8 |
| Stage 1 | T1 | T2 | T3 | | | | | |
| Stage 2 | T1 | | | T3 | T2 | T2 | T2 | |
| Stage 3 | T1 | | T2 | | T3 | | | |
| Stage 4 | T1 | | | | | T3 | | |

In contrast to the conventional pipeline, a pseudo pipeline implemented in accordance with the present invention allows a transaction, for example, to use all of the stages simultaneously (e.g., transaction T1). A pseudo pipeline implemented in accordance with the present invention also allows a transaction to flow through the pseudo pipeline similarly to the flow of transactions through a conventional pipeline (e.g., transaction T3). In another example, a transaction T2 generally demonstrates the flexibility of a pseudo pipeline implemented in accordance with the present invention. For example, at time t+2, T2 skips Stage 2. At time t+3, T2 flows backward with a variable delay of 2 cycles. From t+5 to t+7, T2 uses Stage 2 multiple times, eventually completing after T3.

Figure 3:
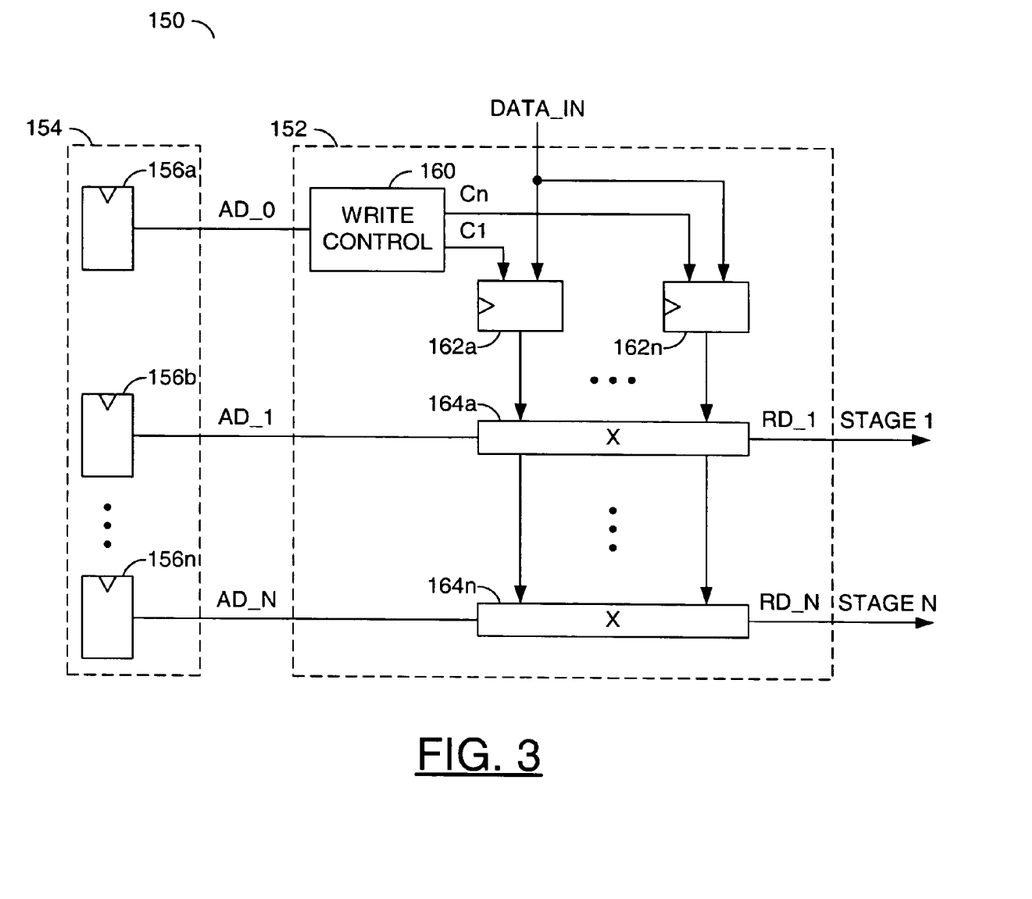
FIG. 3 is a block diagram illustrating a crossbar style pseudo pipeline.

Referring to FIG. 3, a block diagram is shown illustrating a cross bar style implementation of the pseudo pipeline of FIG. 2. In one example, the register file 152 may comprise a block (or circuit) 160, a number of blocks (or circuits) 162a-162n and a number of blocks (or circuits) 164a-164n. The block 160 may be implemented as a write control block. The blocks 162a-162n may be implemented, in one example, as registers. The blocks 164a-164n may be implemented, in one example, as multiplexer blocks (or circuits). The block 160 may have an input that may receive the signal AD_0 and a number of outputs that may present a respective control signal (e.g., C1-Cn) to a corresponding first input of each of the number of blocks 162a-162n. The block 160 may be configured to generate the signals C1-Cn in response to the signal AD_0. In one example, each of the signals C1-Cn may be asserted (or active) in response to the signal AD_0 having values 0 through n−1 respectively.

Each of the blocks 162a-162n may have a second input that may receive the signal DATA_IN and an output that may present a signal to a corresponding data input of each of the blocks 164a-164n. Each of the blocks 164a-164n may have an address input that may receive a respective one of the signals AD_1 to AD_N. Each of the blocks 164a-164n may have an output that may present a respective one of the signals RD_1-RD_N. The number of data registers 162a-162n may be determined by the number of transactions that may be active simultaneously. The read data for each stage may be selected by the multiplexer blocks 164a-164n. In one example, the multiplexer blocks 164a-164n may be arranged as a crossbar switch. Although the example illustrated in FIG. 3 shows a full crossbar, implementations with partially connected crossbars may be implemented with less circuitry to meet the design criteria of particular applications.

Figure 4:
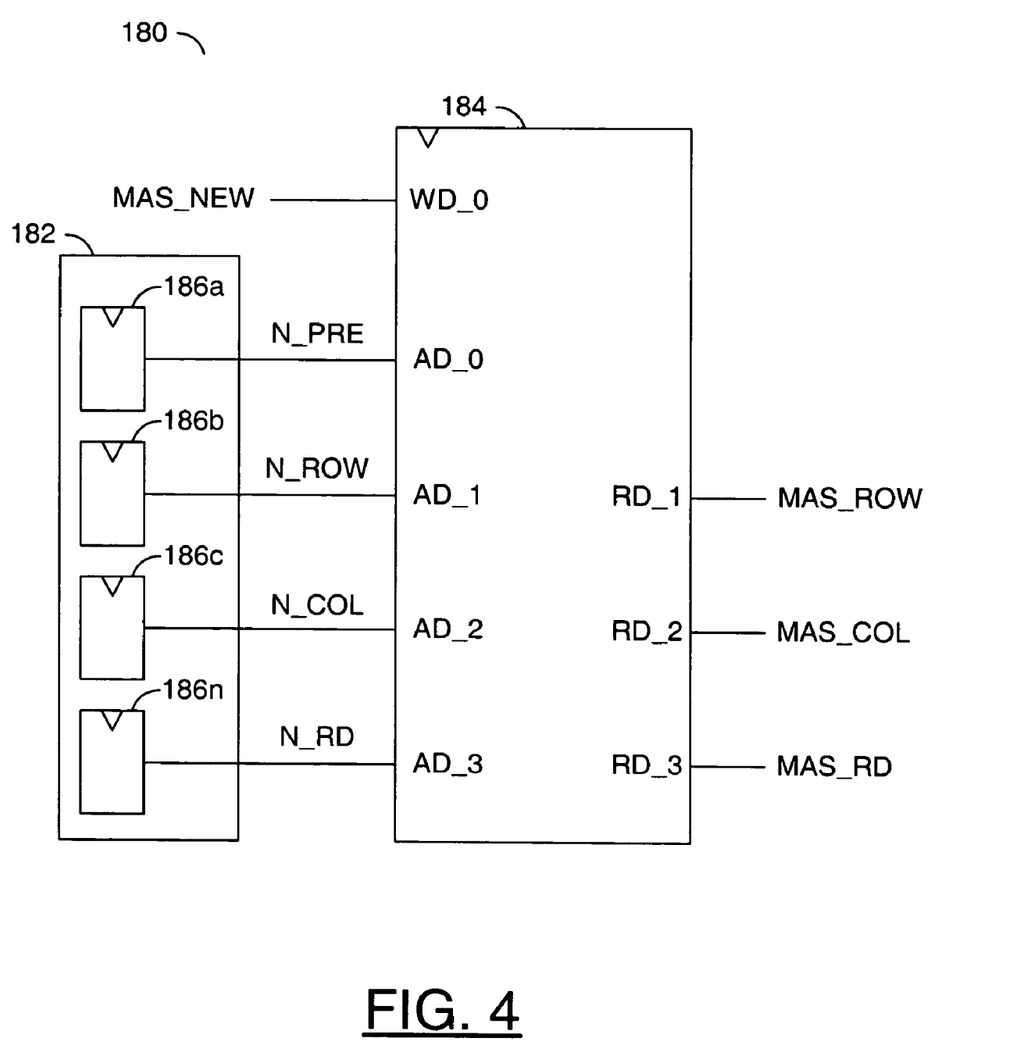
FIG. 4 is a block diagram illustrating an example implementation of a pseudo pipeline.

Referring to FIG. 4, a block diagram is shown illustrating an example implementation of a pseudo pipeline 180 in accordance with the present invention. In one example, the pseudo pipeline 180 may be implemented as part of the memory controller 102. The pseudo pipeline 180 may be implemented, in the context of a pseudo pipelined memory controller, having a precharge stage, a row access stage, a column access and write data stage, and a read data stage. The precharge stage may be used to start all of the transactions.

The pseudo pipeline 180 may comprise a block (or circuit) 182 and a block (or circuit) 184. The block 182 may be implemented as a control circuit. The block 184 may be implemented as a register file. The control circuit 182 may be configured to generate a number of control signals (e.g., N_PRE, N_ROW, N_COL, and N_RD). The signals N_PRE, N_ROW, N_COL, and N_RD specify the transaction number of the transaction in the precharge, row access, column access and read data stages, respectively. The register file 184 may have (i) a first input that may receive a signal (e.g., MAS_NEW), (ii) a number of second inputs that may receive the signals N_PRE, N_ROW, N_COL and N_RD and (iii) a number of outputs that may present a number of output signals (e.g., MAS_ROW, MAS_COL, and MAS_RD). The block 184 may be configured to generate the signal MAS_ROW, MAS_COL, and MAS_RD in response to the signals MAS_NEW, N_PRE, N_ROW, N_COL and N_RD.

At the end of the precharge stage, a value (e.g., MAS_NEW) representing a master module selected by the memory controller 102 may be written into the register file using a pointer AD_0. At the beginning of the other stages, the value representing the master may be read from the register file 184.

In one example, the block 182 may comprise a number (e.g., four) of counters 186a-186n. In one example, the counters 186a-186n may be implemented as 2-bit counters. However, other size counters may be implemented accordingly to meet the design criteria of a particular implementation. The counters 186a-186n may be configured to address the data for each of the pseudo pipeline stages. In one example, transactions may be processed in order within each pseudo pipeline stage. When a transaction completes a stage, the counter corresponding to the stage may be incremented.

An example operation of the counters 186a-186n implemented as 2-bit counters is illustrated in the following TABLE 3:

TABLE 3

| | TIME: | | | | | | | |
|---|---|---|---|---|---|---|---|---|
| | t+0 | t+1 | t+2 | t+3 | t+4 | t+5 | t+6 | t+7 |
| COUNTER 1 | 0 | 1 | 2 | 3 | 0 | 0 | 0 | 0 |
| COUNTER 2 | 0 | 0 | 1 | 2 | 3 | 0 | 0 | 0 |
| COUNTER 3 | 0 | 0 | 0 | 1 | 2 | 3 | 0 | 0 |
| COUNTER N | 0 | 0 | 0 | 0 | 1 | 2 | 3 | 0 |

At time t+0, all the counters 186a-186n are initialized to zero. The counters 186a-186n are incremented so that transactions 1, 2 and 3 (corresponding to count values 1, 2 and 3 respectively) flow through the pseudo pipeline in a manner similar to a conventional pipeline. When transaction 3 completes at time t+6, transaction 4 (corresponding to count value 0) is left active in all stages simultaneously.

Different pseudo pipeline operations may be performed (or implemented) by specifying the increment values for the individual counters 186a-186n. Example increment values and corresponding operations are illustrated in the following TABLE 4:

TABLE 4

| INCREMENT | OPERATION |
|---|---|
| −1 | Backward flow |
| 0 | Repeat stage |
| 1 | Conventional forward flow |
| 2 | Skip one stage |

A variable delay operation may occur when two counters are incremented such that a transaction completes in one stage before starting in a second stage. Other increment values may be implemented accordingly to meet the design criteria of a particular implementation.

Figure 5:
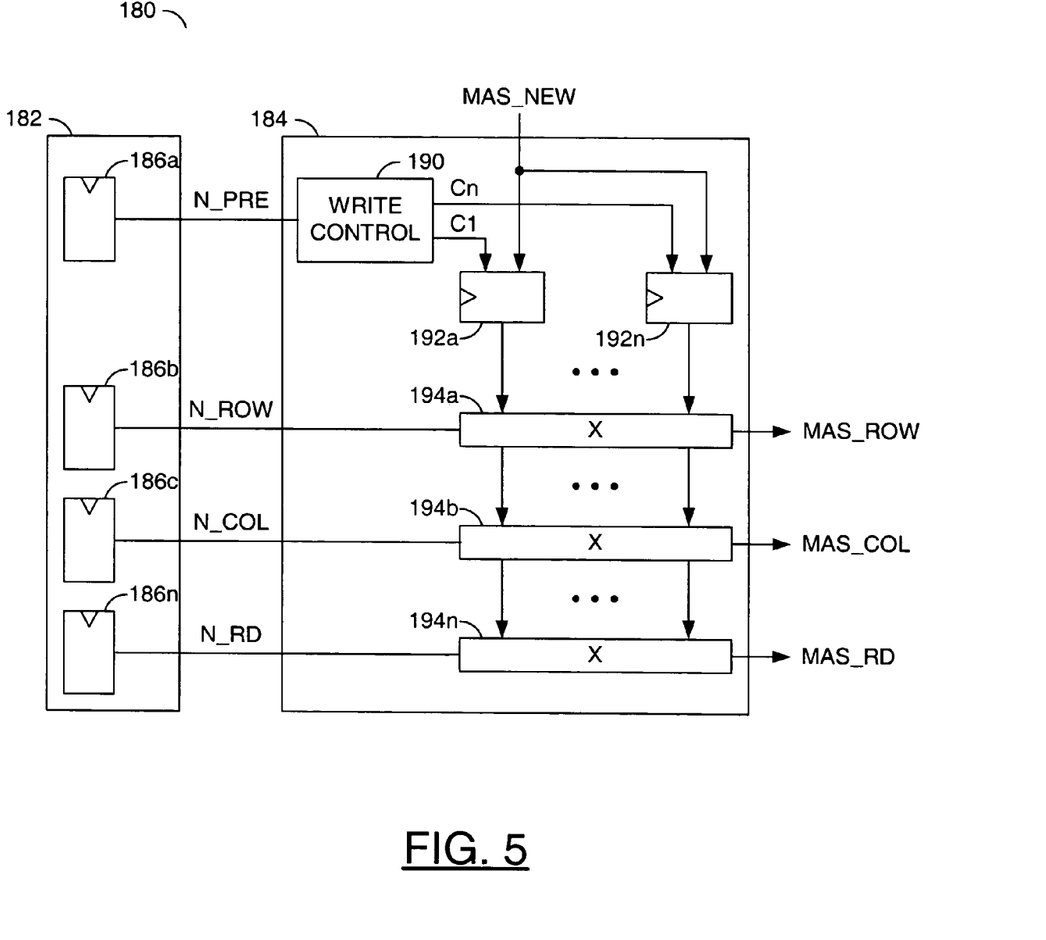
FIG. 5 is a block diagram illustrating details of an internal register file of the pseudo pipeline of FIG. 4.

Referring to FIG. 5, a block diagram is shown illustrating internal details of the register file 184 of FIG. 4. The register file 184 may comprise, in one example, a block (or circuit) 190, a number of blocks (or circuits) 192a-192n and a number of blocks (or circuits) 194a-194n. The block 190 may be implemented, in one example, as a write control block. Each of the blocks 192a-192n may be implemented, in one example, as a data register. Each of the blocks 194a-194n may be implemented, in one example, as a multiplexer circuit. The block 190 may have an input that may receive the signal N_PRE and a number of outputs that may present a respective control signal (e.g., C1-Cn) to a corresponding first input of each of the blocks 192a-192n. The block 190 may be configured to generate the signals C1-Cn in response to the signal N_PRE. In one example, each of the signals C1-Cn may be asserted (or active) in response to the signal N_PRE having values 0 through n−1 respectively.

Each of the blocks 192a-192n may have a second input that may receive the signal MAS_NEW and an output that may present a signal to a corresponding data input of each of the blocks 194a-194n. Each of the blocks 194a-194n may have an address input that may receive a respective one of the signals N_ROW, N_COL and N_RD. Each of the blocks 194a-194n may have an output that may present a respective one of the signals MAS_ROW, MAS_COL and MAS_RD. The number of data registers 192a-192n may be determined by the number of transactions that may be active simultaneously. The read data for each stage may be selected by the multiplexer blocks 194a-194n. In one example, the multi-plexer blocks 194a-194n may be arranged as a crossbar switch. Timing and flow examples for transactions using the pseudo pipeline 180 are generally illustrated in TABLES 3 though 7 below.

A number of SRAM transactions using a pseudo pipeline in accordance with the present invention are illustrated in the following TABLE 5:

TABLE 5

| | TIME: | | | | | | | |
|---|---|---|---|---|---|---|---|---|
| | t+1 | t+2 | t+3 | t+4 | t+5 | t+6 | t+7 | t+8 |
| Precharge | 1 | | 2 | | 3 | | | |
| Row | | | | | 3 | | | |
| Col/Write | 1 | | | | 3 | | | |
| Read | | | 2 | | 3 | | | |

Operation of SRAM transactions is not generally pipelined. All stages/resources are generally used in parallel, rather than sequentially. For example, transaction 1 generally illustrates an SRAM write. Transaction 2 generally illustrates an SRAM read. In practice, all SRAM transactions operate similarly to Transaction 3 with some of the pseudo pipeline stages not used.

A page mode write operation and a page mode read operation using a pseudo pipeline in accordance with the present invention are illustrated in the following TABLES 6 and 7, respectively:

TABLE 6

| | TIME: | | | | | | | |
|---|---|---|---|---|---|---|---|---|
| | t+1 | t+2 | t+3 | t+4 | t+5 | t+6 | t+7 | t+8 |
| Precharge | 1 | | | | | | | |
| Row | | | | | | | | |
| Col/Write | 1 | | 1 | | 1 | | 1 | |
| Read | | | | | | | | |

TABLE 7

| | TIME: | | | | | | | |
|---|---|---|---|---|---|---|---|---|
| | t+1 | t+2 | t+3 | t+4 | t+5 | t+6 | t+7 | t+8 |
| Precharge | 1 | | | | | | | |
| Row | | | | | | | | |
| Col/Write | 1 | | 1 | | 1 | | 1 | |
| Read | | | | 1 | 1 | 1 | 1 | 1 |

Page mode transactions generally do not perform a precharge or row access. For burst transactions, the column access may be repeated every 2 cycles. Write data may be transferred on the column access and the immediately following cycle. Read data may be transferred after a 3 cycle CAS (column address strobe) latency and on the immediately following cycle.

In general, all SDRAM transactions may overlap with only a few restrictions. For example, column access for different transactions may not overlap, data for different transactions may not overlap and a turn around cycle is generally inserted between read and write data.

Random write and random read transactions using a pseudo pipeline in accordance with the present invention are generally illustrated in the following TABLES 8 and 9, respectively.

TABLE 8

| | t+1 | t+2 | t+3 | t+4 | t+5 | t+6 | t+7 | t+8 | t+9 | t+10 | t+11 | t+12 | t+13 |
|---|---|---|---|---|---|---|---|---|---|---|---|---|---|
| TIME: | | | | | | | | | | | | | |
| Pre | 1 | | | | | | | | | | | | |
| Row | | | | 1 | | | | | | | | | |
| Col/Write | | | | | | | 1 | | 1 | | 1 | | 1 |
| Read | | | | | | | | | | | | | |

TABLE 9

| | t+1 | t+2 | t+3 | t+4 | t+5 | t+6 | t+7 | t+8 | t+9 | t+10 | t+11 | t+12 | t+13 |
|---|---|---|---|---|---|---|---|---|---|---|---|---|---|
| TIME: | | | | | | | | | | | | | |
| Pre | 1 | | | | | | | | | | | | |
| Row | | | 1 | | | | | | | | | | |
| Col/Write | | | | | | 1 | | 1 | | 1 | | 1 | |
| Read | | | | | | | | | | 1 | 1 | 1 | 1 |

Random transactions may start by precharging the addressed SDRAM bank. After a 3 cycle precharge to RAS (row address strobe) latency, a row activate may be performed. After a 3 cycle RAS to CAS delay, random access transactions may operate similarly to page mode transactions (described above in connection with TABLES 6 and 7).

Figure 6:
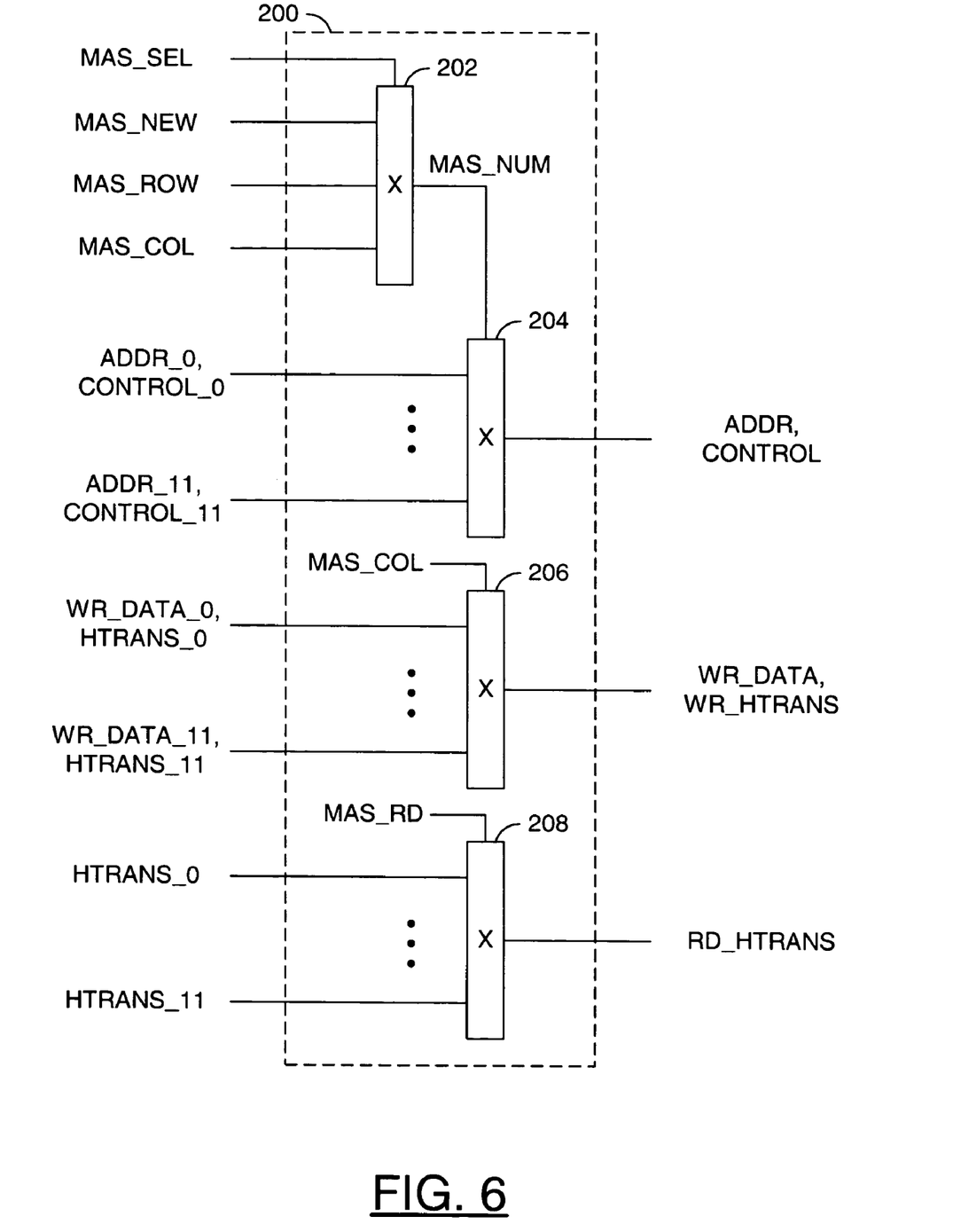
FIG. 6 is a block diagram illustrating controlling a front end logic using the pseudo pipeline of FIG. 4.

Referring to FIG. 6, a block diagram is shown illustrating an example of a front end logic 200 of the memory controller 102. The pseudo pipeline 180 may be configured to control the front end logic 200. In one example, the front end logic 200 may comprise a block (or circuit) 202, a block (or circuit) 204, a block (or circuit) 206 and a block (or circuit) 208. In one example, the blocks 202-208 may be implemented as multiplexers. The multiplexer 202 may have a first input that may receive the signal MAS_NEW, a second input that may receive the signal MAS_ROW, a third input that may receive the signal MAS_COL and a control input that may receive a control signal (e.g., MAS_SEL). The multiplexer 202 may have an output that may present an output signal (e.g., MAS_NUM). The signal MAS_NUM generally represents a number of an active master for a current SDRAM cycle. The signal MAS_SEL generally selects the master that requested the transaction that includes the current SDRAM command. The multiplexer 202 may be configured to select one of the signals MAS_NEW, MAS_ROW and MAS_COL for presentation as the signal MAS_NUM.

The signal MAS_NUM may be presented to a control input of the multiplexer 204. The multiplexer 204 may have a number of inputs that may receive a number of address signals (e.g., ADDR_0 ... ADDR_11) and control signals (e.g., CONTROL_0 ... CONTROL_11). The multiplexer 204 may be configured to select the address and control signals from a corresponding input for presentation at an output in response to the signal MAS_NUM.

The signal MAS_COL may be presented to a control input of the multiplexer 206. The multiplexer 206 may be used during write cycles. The multiplexer 206 may be configured to select from a number of write data inputs (e.g., WR_DATA_0 ... WR_DATA_11) and a number of inputs receiving signals indicating a type for the current transfer (e.g., HTRANS_0 ... HTRANS_11) for presentation as write transaction signals (e.g. WR_DATA, WR_HTRANS) in response to the signal MAS_COL. In one example, the signals HTRANS_0 ... HTRANS_11 may be implemented as unregistered HTRANS bits. In one example, the signals HTRANS_0 ... HTRANS_11 may be implemented in compliance with the Advanced Microcontroller Bus Architecture (AMBA) specification (AMBA is a trademark of ARM limited). When the signals HTRANS_0 ... HTRANS_11 are implemented in compliance with the AMBA specification, the signals HTRANS_0 ... HTRANS_11 may have values indicating whether transfers are nonsequential, sequential, idle or busy.

The signal MAS_RD may be presented to a control input of the multiplexer 208. The multiplexer 208 may be used during read cycles. The multiplexer 208 may be configured to select one of the signals HTRANS_0 ... HTRANS_11 for presentation, as a read transaction signal (e.g., RD_TRANS). For example, the multiplexer 208 may select one of the signals HTRANS_0 ... HTRANS_11 for presentation as the signal RD_TRANS in response to the signal MAS_RD.

Figure 7:
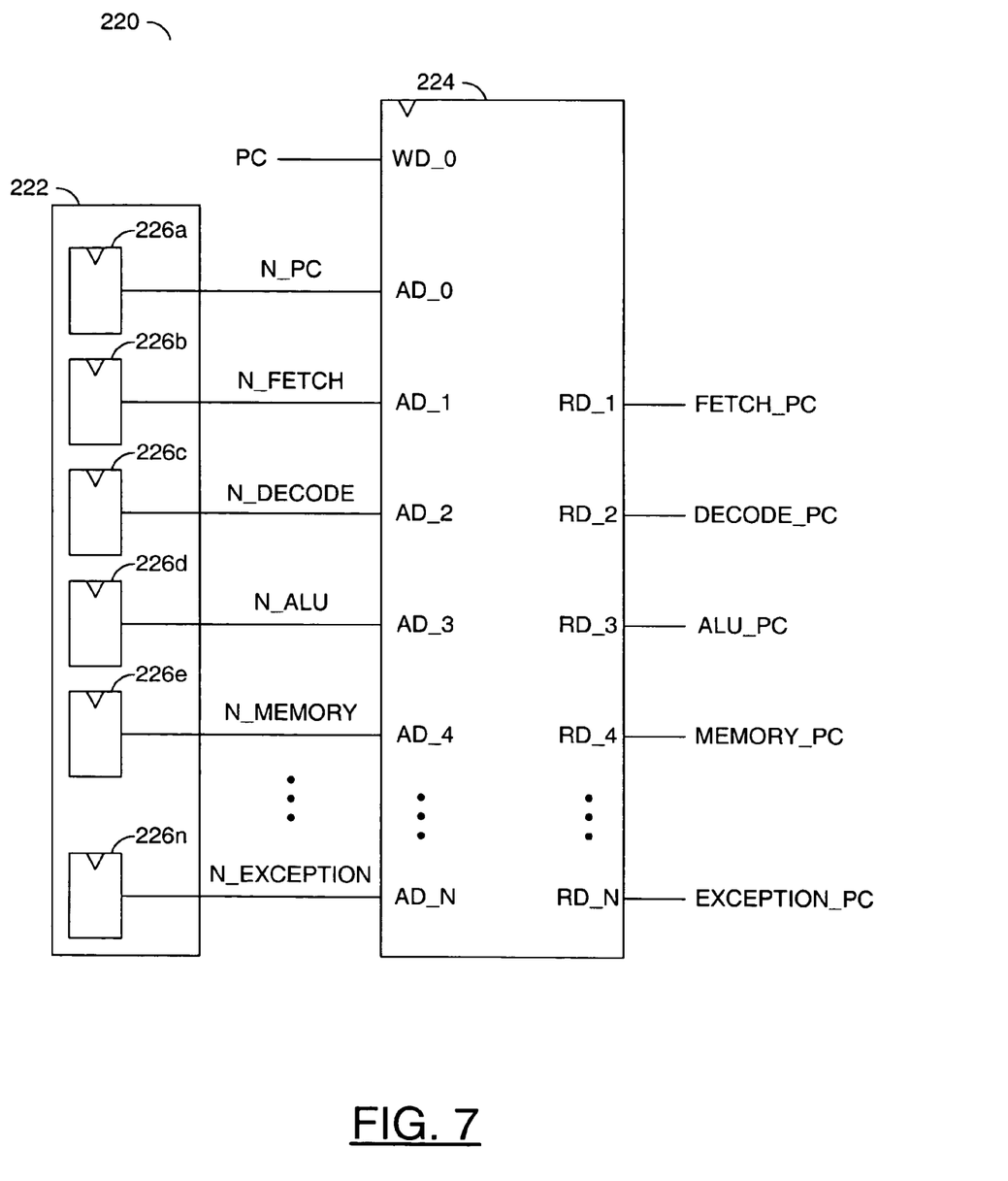
FIG. 7 is a block diagram illustrating another example implementation of a pseudo pipeline.

The front end logic may include, in one example, an h_ready logic. In one example, the h_ready logic may be configured to indicate a status of a transfer. In one example, the h_ready logic may be implemented as a simple demultiplexing circuit configured to return a signal (e.g., H_READY) to the correct master during read and write cycles. In one example, the signal H_READY may have a first state that may indicate a transfer is complete and a second state that may indicate a transfer is extended. An example of an h_ready logic may be described using Verilog as follows:

assign    H_READY=({12{H_READY_WR}}    &
  (12'b1<<MAS_COL)|({12{H_READY_RD}}    &
  (12'b1<<MAS_RD));

Referring to FIG. 7, a block diagram is shown illustrating a pseudo pipeline 220 in accordance with the present invention. The pseudo pipeline 220 may be configured to manage a program counter (PC) of a central processing unit (CPU) with a conventional pipeline. The PC value for each instruction may be entered into a first stage of the pseudo pipeline 220. The PC value may be used in several different stages depending on an instruction being processed. For example, the PC value may be used in an early stage by a PC relative branch instruction, a middle stage by a PC relative load instruction, or saved in a final stage if an instruction encountered an exception.

In one example, the pseudo pipeline 220 may be configured to implement an initial stage, a fetch stage, a decode stage, an arithmetic logic unit (ALU) stage, a memory stage, and an exception stage. The pseudo pipeline 220 may comprise a block (or circuit) 222 and a block (or circuit) 224. The block 222 may be implemented as a control circuit. The block 224 may be implemented as a register file. In one example, the block 224 may be implemented similarly to the block 152 (described above in connection with FIG. 3.

The block 222 may be configured to generate a number of control signals (e.g., N_PC, N_FETCH, N_DECODE, N_ALU, N_MEMORY, and N_EXCEPTION). The control signals N_PC, N_FETCH, N_DECODE, N_ALU, N_MEMORY, and N_EXCEPTION may specify transaction numbers for various stages of the processor pipeline. The block 224 may have (i) a first input that may receive a signal (e.g., PC), (ii) a number of second inputs that may receive the control signals N_PC, N_FETCH, N_DECODE, N_ALU, N_MEMORY, and N_EXCEPTION and (iii) a number of outputs that may present output signals (e.g., FETCH_PC, DECODE_PC, ALU_PC, MEMORY_PC, EXCEPTION_PC). The signal PC may comprise a value of the program counter of the CPU. The block 224 may be configured to generate the signals FETCH_PC, DECODE_PC, ALU_PC, MEMORY_PC, EXCEPTION_PC in response to the signal PC and the control signals N_PC, N_FETCH, N_DECODE, N_ALU, N_MEMORY, and N_EXCEPTION.

In one example, the block 222 may comprise a number of counters 226a-226n. In one example, the counters 226a-226n may be implemented as n-bit counters, where the number of stages in the pseudo pipeline 220 is less than or equal to $2^n$. However, other size counters may be implemented accordingly to meet the design criteria of a particular implementation. The counters 226a-226n may be configured to address the data for each of the pseudo pipeline stages.

The pseudo pipeline 220 in accordance with the present invention generally operates with lower power consumption than a conventional pipeline. In the pseudo pipeline 220 in accordance with the present invention, only a single register is clocked every cycle. In a conventional PC pipeline, all registers are clocked every cycle.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) to meet the design criteria of a particular implementation. Additionally, inverters may be added to change a particular polarity of the signals.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A pseudo pipeline comprising:
a register file having at least one write port and a plurality of read ports, wherein said plurality of read ports are configured as outputs of a plurality of pseudo pipeline stages; and
a control circuit configured to control the register file to provide pseudo pipelined operation, wherein
(a) the register file comprises a plurality of registers,
(b) data presented to the at least one write port is written to one of said plurality of registers based on a write address presented to said at least one write port,
(c) each of the outputs of the plurality of pseudo pipeline stages is coupled to an output of one of said plurality of registers based on a respective read address presented to a respective one of the plurality of read ports,
(d) each of the respective read addresses is generated such that (i) said data moves between the outputs of the plurality of pseudo pipeline stages and (ii) said data remains in the register in which said data was written rather than being moved to other registers in said register file, and
(e) said pseudo pipelined operation comprises one or more of a plurality of modes including (i) a first mode characterized by a positive delay between adjacent pseudo pipeline stages, (ii) a second mode characterized by a negative delay between adjacent pseudo pipeline stages, (iii) a third mode characterized by one or more pseudo pipeline stages being skipped in a forward direction, (iv) a fourth mode characterized by one or more pseudo pipeline stages being skipped in a backwards direction, and (v) a fifth mode characterized by two or more pseudo pipeline stages presenting the same data simultaneously.

2. The pseudo pipeline according to claim 1, wherein said pseudo pipeline is part of a memory controller.

3. The pseudo pipeline according to claim 2, wherein said memory controller is connected to a memory device.

4. The pseudo pipeline according to claim 3, wherein said memory device comprises a synchronous dynamic random access memory (SDRAM).

5. The pseudo pipeline according to claim 3, wherein said memory device comprises a static random access memory (SRAM).

6. The pseudo pipeline according to claim 3, wherein said memory device comprises a programmable read only memory (PROM).

7. The pseudo pipeline according to claim 1, wherein said plurality of pseudo pipeline stages are each configured to provide variable delay.

8. The pseudo pipeline according to claim 1, wherein each of said plurality of pseudo pipeline stages are configured to provide a delay ranging from 0 to N clock cycles.

9. The pseudo pipeline according to claim 1, wherein said control circuit is further configured to allow one or more of said plurality of pseudo pipeline stages to be skipped.

10. The pseudo pipeline according to claim 1, wherein said control circuit is further configured to allow operations to use two or more of said plurality of pseudo pipeline stages simultaneously.

11. The pseudo pipeline according to claim 1, wherein said control circuit is further configured to allow operations to flow backwards through one or more of said plurality of pseudo pipeline stages.

12. The pseudo pipeline according to claim 1, wherein said control circuit comprises one or more write pointers and a plurality of read pointers.

13. The pseudo pipeline according to claim 12, wherein each of said plurality of read pointers comprises a counter.

14. The pseudo pipeline according to claim 1, wherein:
each of said plurality of pseudo pipeline stages comprises a multiplexer circuit configured to select between outputs of the plurality of registers in response to a respective read pointer.

15. The pseudo pipeline according to claim 1, wherein said pseudo pipeline is configured to manage a program counter.

16. A method of controlling data flow comprising:
generating at least one write pointer and a plurality of read pointers;
writing data into one of a plurality of registers based upon said write pointer; and
accessing read data from said plurality of registers in response to said plurality of read pointers, wherein the read data is presented as outputs of a plurality of pseudo pipeline stages and said plurality of read pointers are generated to provide pseudo pipelined operation, wherein (a) each of said plurality of read pointers is generated such that (i) said read data moves between the outputs of the plurality of pseudo pipeline stages and (ii) said read data remains in the register in which said read data was written rather than being moved between said plurality of registers, and (b) said pseudo pipelined operation comprises one or more of a plurality of modes including (i) a first mode characterized by a positive delay between adjacent pseudo pipeline stages, (ii) a second mode characterized by a negative delay between adjacent pseudo pipeline stages, (iii) a third mode characterized by one or more pseudo pipeline stages being skipped in a forward direction, (iv) a fourth mode characterized by one or more pseudo pipeline stages being skipped in a backwards direction, and (v) a fifth mode characterized by two or more pseudo pipeline stages presenting the same data simultaneously.

17. The method of claim 16, wherein said data flow includes a variable delay between at least two of said plurality of pseudo pipeline stages.

18. The method of claim 16, wherein said data flow uses two or more of said plurality of pseudo pipeline stages simultaneously for a single transaction.

19. The method of claim 16, wherein said data flow comprises a backwards flow.

20. A memory controller comprising:

a register file having at least one write port and a plurality of read ports, wherein said plurality of read ports are configured as outputs of a plurality of pseudo pipeline stages; and a control circuit configured to control the register file, wherein the plurality of pseudo pipeline stages provide pseudo pipelined operation and are configured as a precharge stage, a row access stage, a column access and write data stage, and a read data stage, and wherein (a) the register file comprises a plurality of registers, (b) data presented to the at least one write port is written to one of said plurality of registers based on a write address presented to said at least one write port, (c) each of the outputs of the plurality of pseudo pipeline stages is coupled to an output of one of said plurality of registers based on a respective read address presented to a respective one of the plurality of read ports, (d) each of the respective read addresses is generated such that (i) said data moves between the outputs of the plurality of pseudo pipeline stages and (ii) said data remains in the register in which said data was written rather than being moved between said plurality of registers, and (e) said pseudo pipelined operation comprises one or more of a plurality of modes including (i) a first mode characterized by a positive delay between adjacent pseudo pipeline stages, (ii) a second mode characterized by a negative delay between adjacent pseudo pipeline stages, (iii) a third mode characterized by one or more pseudo pipeline stages being skipped in a forward direction, (iv) a fourth mode characterized by one or more pseudo pipeline stages being skipped in a backwards direction, and (v) a fifth mode characterized by two or more pseudo pipeline stages presenting the same data simultaneously.

21. The memory controller according to claim 20, further comprising:

a first multiplexer configured to select one of a plurality of transaction numbers in response to a master selection signal;

a second multiplexer configured to select address and control signals from a plurality of address and control signals in response to an output of the first multiplexer;

a third multiplexer configured to select one of a plurality of write data streams in response to a transaction in the column access and write data stage; and a fourth multiplexer configured to select one of a plurality of unregistered HTRANS bits for presentation as a read transaction look ahead in response to a transaction in the read data stage.

22. The pseudo pipeline according to claim 1, wherein a single register in said register file is clocked during a clock cycle.

23. The pseudo pipeline according to claim 1, wherein said register file comprises:

a write control circuit configured to generate a plurality of control signals in response to the write address received at said at least one write port; and each of said plurality of registers receives a data signal received at said at least one write port and is configured to store said data signal in response to a respective one of said plurality of control signals.

24. The pseudo pipeline according to claim 23, wherein said register file further comprises a crossbar switch configured to select outputs of said plurality of registers for presentation as outputs of said plurality of pseudo pipeline stages in response to read addresses received at said plurality of read ports.

25. The pseudo pipeline according to claim 24, wherein said crossbar switch comprises a fully connected crossbar switch.

26. The pseudo pipeline according to claim 1, wherein said pseudo pipeline comprises N stages and N read ports, and said register file comprises:

a write control circuit configured to generate N control signals in response to the write address received at said at least one write port;

said plurality of registers comprises N registers, each register having a control input receiving a respective one of said N control signals, a data input connected with the data input of the other N−1 registers and receiving the data received at said at least one write port and an output, wherein each register stores the data in response to said respective one of said N control signals and presents the stored data at the output;

N multiplexer circuits, each multiplexer circuit having N data inputs, a control input and an output, wherein each of said N data inputs is connected to a respective one of the outputs of the N registers, the control input receives a respective read address from a respective one of said N read ports, and said output is connected to a respective output of a respective one of the N pseudo pipeline stages, wherein each of said N multiplexer circuits selects a signal received at one of the N data inputs for presentation at the output based upon the respective read address received at the control input.

* * * * *